United States Patent Office 3,535,305
Patented Oct. 20, 1970

3,535,305
LOW TEMPERATURE SOLVENT EXTRACTION PROCESS FOR PRODUCING HIGH PURITY ZEIN
Roy Carter, Westminster, and Donald Roy Reck, Fullerton, Calif., assignors to Nutrilite Products, Inc., Buena Park, Calif., a corporation of California
No Drawing. Filed Feb. 12, 1968, Ser. No. 704,532
Int. Cl. A23j 1/00; C07g 7/00
U.S. Cl. 260—123                                                  8 Claims

ABSTRACT OF THE DISCLOSURE

High-purity zein is produced by extracting grain gluten with a concentrated aqueous alcohol solution or the like, separating gluten solids from the resulting extract, precipitating a taffy-like zein-alcohol phase from the extract by cooling it, decanting supernatant solvent from the zein-alcohol phase, and recovering zein product from the latter. Repetition of the extraction, cooling and decanting cycles results in an increasingly pure zein product.

BACKGROUND OF THE INVENTION

It has long been known in the art that zein could be extracted from grain proteins such as corn gluten by extraction with an aqueous organic solvent such as aqueous ethyl or isopropyl alcohol, sometimes followed by re-extraction of the extract with a fat solvent such as hexane or benzene, recovery of residual volatile hydrocarbon from the extract by distillation and precipitation of the zein by mixing the remaining alcoholic solution with a large proportion of water. However, such prior processes have required a high capital investment and were characterized by high operating costs due to the complex solvent recovery systems required. This has been particularly true in processes wherein mixtures of alcohol and a hydrocarbon solvent were used or formed and wherein a high degree of solvent recovery was required not only for reasons of economy, but also to minimize explosion hazards. Because such prior processes generally required keeping the zein dissolved in a solvent or sequence of solvents over extended periods at temperatures at which proteins tend to undergo chemical change and become denatured, they were frequently plagued by gellation difficulties unless the hydrogen ion concentration of the protein solutions was carefully monitored and controlled, and they have tended to produce a brownish grey product unless elaborate processing schemes were employed and meticulously observed. Consequently, commercial production of zein has heretofore been of only marginal economic interest and in fact has in recent years been abandoned by some of the largest corn refiners as being uneconomical. Representative disclosures of the technology previously employed in the production of zein can be found, for instance, in Industrial & Engineering Chem., 33, 394–398 (1941) or in U.S. Pat. 2,105,760.

It is an object of the present invention to provide an improved process for the extraction of zein. More particularly it is an object of this invention to provide a process which employs relatively simple solvent systems, in which zein solutions are kept for only relatively short periods under conditions tending to cause proteins to denature, and which can be economically used to produce a zein of consistently high quality. A specific object is to provide a zein extraction process wherein it is not necessary to separate zein from solvent by distillation or by extraction with a second solvent. These and other objects, as well as their attainment will become more fully apparent from the description that follows.

DESCRIPTION OF THE INVENTION

This invention relates to an improved process for producing zein of high purity and light color from gluten, that is, from the mixed proteins present in maize and other grains such as wheat, rice, oats and barley. According to this invention commercial gluten, such as corn gluten meal containing about 40% to 70% protein on a dry basis, preferably about 60% protein, is first extracted with a concentrated aqueous organic solvent such as 60% to 90% isopropyl alcohol, at a moderately elevated temperature. At least about 3 parts of solvent, preferably 3.5 to 5 parts, per part of gluten can be conveniently used, the optimum ratio depending somewhat on whether a single stage or a multiple stage process is used, as well as on the moisture content of the gluten and the water content of the solvent. Generally speaking, it is desirable to select a strength and proportion of solvent such as to give an extracting liquid containing about 85% to 90% ethyl or isopropyl alcohol and correspondingly 15% to 10% water, it being understood that all proportions of materials are expressed on a weight basis throughout this entire specification unless otherwise indicated. This extraction is preferably carried out at a temperature between 55° and 70° C. While aqueous isopropyl or ethyl alcohol are preferred as solvents, concentrated aqueous solutions of other oxygen-containing organic solvents which are known to dissolve zein can be used similarly. Such solvents include acetone, methyl ethyl ketone, ethylene glycol, diethyl glycol, ethyl ether of ethylene glycol, furfuryl alcohol, tetrahydrofurfuryl alcohol and the like. If desired, the pH of the extracting liquid may be adjusted to between about 6.5 and 7 by adding to it a small amount of an aqueous alkali metal hydroxide solution such as sodium hydroxide.

After completion of the extraction step, undissolved solids are separated from the resulting liquid extract by mechanical means such as by filtration or centrifuging. Typically, the extract may contain about 5% to 15%, preferably 10% to 12% dissolved crude zein. The mechanical separation of solids from the liquid extract is preferably carried out at or near room temperature, e.g., between about 18° and 25° C., all of these initial steps being conducted essentially in accordance with heretofore conventional practice. However, instead of proceeding to recover zein from the liquid extract in accordance with prior teachings, such as by distilling out the primary solvent or by adding a hydrocarbon solvent to the extract to cause it to separate into a zein-rich concentrate and supernatant mixed solvent layer containing most of the vegetable oil and xanthophyll pigment, the present invention processes the liquid extract in a novel manner which results in important and surprising advantages.

More particularly, after separation of undissolved solid from the extract the latter is chilled to a temperature which is above the freezing point of the liquid solvent and which cause the extract to separate into two distinct phases, e.g., to a temperature between about +10° and −25° C., preferably to between about −10° and −20° C., whereupon the resulting supernatant liquid is removed by decanting from the heavy yellow taffy-like bottom layer or phase. This taffy-like phase generally contains from about 20% to 40% of zein with the remainder being solvent and a small amount of dissolved corn oil and oil solubles such as xanthophyll. When chilling to the preferred temperature range indicated above, the taffy-like phase in a typical case contains 95% or more of the total zein extracted from the gluten feed and less than 20% of the extracted oil and oil solubles such as xanthophyll. By chilling to less deep temperatures than those indicated, a relatively smaller proportion of the extracted zein is found in the bottom layer and relatively greater proportion remains in the liquid solvent phase.

The taffy-like phase or mass can then be dried in any convenient manner, e.g., in a vacuum tray drier at 50° C., preferably after first reducing its viscosity by allowing or causing its temperature to rise to at least about 15° C., e.g., between 15° and 30° C. Drying temperatures preferably should not exceed about 100° C., and temperatures below 70° C. are particularly preferred. In this way dry, light yellow zein containing only about 2% oil and oil solubles is readily produced. If a purer product is desired the taffy-like mass after being warmed to liquefy is diluted with a new portion of aqueous organic solvent, e.g., by adding a further amount of 85% isopropyl alcohol to produce a solution containing about 2% to 15% zein, preferably 6% to 12%, and this dilute solution is then chilled again as indicated before, which re-separates the zein and removes most of the oil remaining after the first separation into the supernatant liquid solvent phase. The degree of oil removed depends on the dilution used. When this supernatant liquid is decanted from the concentrated zein-alcohol phase after the second chilling step, this liquid may be used to extract a fresh charge of gluten. Zein containing less than 0.6% oil and oil solubles can be prepared from the taffy-like zein-alcohol phase from the second chilling step by warming it and transferring the resulting liquefied zein solution to any convenient drier such as the vacuum tray drier previously described.

The procedure described above may of course be varied or modified in various ways. For instance, instead of directly chilling the zein-containing extract after separation of the insoluble portion of the gluten meal, it can be advantageous to raise the alcohol concentration in the extract by adding a more nearly anhydrous alcohol to it or by adding the extract to the more nearly anhydrous alcohol. More particularly, the extract may be added to an appropriate volume of pre-chilled, anhydrous or nearly anhydrous alcohol whereby phase separation is obtained. As an example, the addition of one volume of extract to 0.5 to 2 volumes of 95% to 99% isopropyl alcohol pre-chilled to about −20° C. can thus be used to produce in a single step a zein containing 1.4% oil or less. Naturally, the higher the ultimate alcohol concentration of the extract, the higher the temperature at which the desired phase separation occurs.

The high purity zein made as described above is eminently suited for the coating of tablets containing materials such as vitamins and various drugs. Moreover, because of its low solubility in water a thin film coating of it having a thickness of 0.05 mm. or less can be used to protect the contents of medicinal tablets from the atmosphere and to mask the taste of unpleasantly tasting drugs when they are swallowed. Because of its exceptionally light color, its solutions in an alcoholic solvent permit ready and economical formulation of bright colored film coatings for spray application, employing approved water-soluble dyes such as FD&C Red No. 2, or the formulation of white film coatings by employing a relatively small proportion of titanium dioxide. To facilitate the use of water-soluble dyes in alcoholic zein solutions, initial dissolution of such dyes in a water-soluble and ingestible polyhydric alcohol such as glycerine or propylene glycol has been found particularly advantageous. In this manner, for instance, a coating solution can be prepared containing about 10% to 20% zein, 1% to 5% glycerine, 1% to 5% titanium dioxide, 0.5% to 3% water-soluble dye such as FD&C Red No. 2, 65% to 80% ethyl alcohol (75% concentration), plus auxiliary amounts of conventional plasticizers, excipients and the like.

The invention will next be illustrated by a specific example.

EXAMPLE

Commercial corn gluten meal was used as feed to make zein. This corn gluten meal contained 65% protein, about 12% moisture as determined by weight loss on drying at 105° C., about 2.5% oil and oil solubles, the remainder being various carbohydrates, fiber and ash. 100 parts of the corn gluten meal is placed in a stainless steel covered tank equipped with a mechanical stirrer. To this is added 400 parts of 88% isopropyl alcohol containing 1 part sodium hydroxide, preheated to 65° C. The resulting mixture is mildly agitated so as to maintain suspension of the meal particles in the liquid. After so agitating the mixture for one hour, in which time the temperature of the mixture drops to 55° C., the mixture is centrifuged and the separated liquid filtered after cooling to room temperature (about 25° C.).

The cake from the centrifuge can be dried and used as animal feed.

The filtrate is chilled to about −15° C. by means of cooling coils, i.e., by indirect heat exchange whereby it separates into a taffy-like zein-alcohol bottom layer (1 volume) and a supernatant liquid layer (4 volumes). The supernatant layer is decanted from the chilled zein-alcohol layer and the latter is allowed to warm up to room temperature. The zein-alcohol layer contains about 30% zein or about 24 parts zein per 100 parts of gluten feed.

One-half of the zein-alcohol solution (40 parts) is dried on a vacuum drum drier at about 50° C. and a pressure of about 0.06 atm. The resulting dry zein sheet is milled to a fine, free-flowing powder which is light orange yellow and contains about 2% oil and oil solubles.

To make a high-purity product, the other 40 parts of the zein-alcohol solution containing about 30% zein is mixed with an additional 200 parts of 88% isopropyl alcohol and this diluted solution is again chilled to −15° C. whereby it again separates to give a taffy-like zein-alcohol bottom layer (1 volume) and a supernatant liquid layer (about 6 volumes). This supernatant layer when decanted may be used directly as solvent to extract fresh gluten meal.

The taffy-like zein-alcohol layer is again warmed to room temperature and dried and milled as previously described. The zein powder resulting from such a two-stage chill separation is light straw colored and contains only about 0.4% oil and oil solubles. The yield of zein from this two-stage chill separation process is about 22% based on initial gluten feed.

The invention described above is particularly pointed out in the appended claims, it being understood that it may be varied or modified in various ways as may occur to those skilled in the art, without departing from the scope or spirit hereof.

We claims:
1. Process for extracting zein from grain gluten which comprises:
 (a) mixing said gluten with a concentrated aqueous solvent solution containing between about 60% and about 95% of a solvent selected from the class consisting of alkanols of 2 to 3 carbon atoms per molecule, acetone, methyl ethyl ketone, ethylene glycol, diethylene glycol, ethyl ether of ethylene glycol, furfuryl alcohol, tetrahydrofurfuryl alcohol, and mixtures thereof;
 (b) heating the mixture of gluten and aqueous solvent solution at a temperature between about 50° and 75° C.;

(c) mechanically separating undissolved solids from the resulting crude zein solution containing from about 5 to about 15% zein as well as extracted oil and oil solubles dissolved in said solvent;

(d) chilling said crude zein solution by indirect heat exchange to a temperature between about +10° and −25° C. which is above the freezing point of the zein solution and at which the solution separates into a taffy-like bottom liquid layer containing from about 20% to about 40% zein and only a small amount of the extracted oil and oil solubles dissolved in the solvent and a supernatant liquid solvent layer containing oil and oil solubles and only a small amount of zein dissolved therein; and (e) removing the supernatant liquid from the cool, taffy-like zein-solvent layer.

2. A process according to claim 1 wherein the solvent in said aqueous solution is ethyl or isopropyl alcohol and said solution is adjusted to a pH of between about 6.5 and 7.

3. A process according to claim 1 wherein the solvent solution is an aqueous solution containing between about 85% and 93% by weight of ethyl or isopropyl alcohol, and wherein the crude zein solution is separated into two liquid phases by chilling said solution to a temperature between about −10° C. and −25° C.

4. A process according to claim 3 wherein the taffy-like zein-alcohol layer is dried at a temperature between about 50° and 100° C. to form dry, solid zein.

5. A process according to claim 4 wherein the temperature of the cool, taffy-like zein-alcohol layer is increased to convert the layer into a free-flowing liquid after separation of the supernatant solvent phase and before drying.

6. Process for extracting high purity zein from corn gluten which comprises:

(a) mixing 1 part by weight of corn gluten containing between about 40% and 70% protein with 3.5 to 5.0 parts by weight of an isopropyl alcohol-water solution adjusted to a pH of between about 6.5 and about 7 and containing between 85% and 93% alcohol;

(b) heating the resulting mixture at a temperature between about 55° and 75° C. to extract zein from the gluten;

(c) mechanically separating undissolved solids from the resulting liquid extract;

(d) cooling said liquid extract to a temperature between about −10° C. and −25° C. whereby said extract separates into a taffy-like zein-alcohol phase containing zein in a concentration of from about 20% to about 40%, said taffy-like phase containing at least about 95% of the total extracted zein, and a supernatant liquid solvent phase containing oil and oil solubles dissolved therein;

(e) separating the supernatant solvent phase from the cool, taffy-like zein-alcohol phase;

(f) warming said taffy-like zein-alcohol phase to a temperature between about 15° and 30° C. to liquefy it and diluting it with additional isopropyl alcohol-water solution containing between 85% and 93% alcohol in a proportion to provide a dilute solution containing between about 2% and 15% dissolved zein;

(g) cooling the resulting dilute zein solution to a temperature between about −10° C. and −25° C. whereby said dilute zein solution separates into a second taffy-like zein-alcohol phase and a second supernatant liquid solvent phase;

(h) separating said second supernatant solvent phase from said second taffy-like zein-alcohol phase;

(i) warming said second taffy-like zein-alcohol phase to liquefy it; and (j) heating said liquefied zein-alcohol phase to evaporate solvent therefrom to form a light-colored solid zein product.

7. Process for extracting zein from grain gluten which comprises:

(a) mixing said gluten with a concentrated aqueous solvent solution between about 60% and about 95% solvent selected from the class consisting of alkanols of 2 to 3 carbon atoms per molecule, acetone, methyl ethyl ketone, ethylene glycol, diethylene glycol, ethyl ether of ethylene glycol, furfuryl alcohol, tetrahydrofurfuryl alcohol, and mixtures thereof;

(b) heating the mixture of gluten and aqueous solvent solution at a temperature between about 50° and 75° C.;

(c) mechanically separating undissolved solids from the resulting crude zein solution containing from about 5 to about 15% zein as well as extracted oil and oil solubles dissolved in said solvent;

(d) chilling said crude zein solution by indirect heat exchange to a temperature between about +10° and −25° C. which is above the freezing point of the zein solution and at which the solution separates into a taffy-like bottom liquid layer containing from about 20% to about 40% zein and only a small amount of the extracted oil and oil solubles dissolved in the solvent and a supernatant liquid solvent layer containing oil and oil solubles and only a small amount of zein dissolved therein;

(e) removing the supernatant liquid from the cool, taffy-like zein-solvent layer; and (f) separating dry solid zein from said taffy-like layer by evaporation of solvent therefrom.

8. Process for extracting zein from grain gluten which comprises:

(a) mixing said gluten with a concentrated aqueous solvent solution containing between about 60% and about 95% of a water-soluble zein solvent selected from the class consisting of alkanols of 2 to 3 carbon atoms per molecule, acetone, methyl ethyl ketone, ethylene glycol, diethylene glycol, ethyl ether of ethylene glycol, furfuryl alcohol, tetrahydrofurfuryl alcohol, and mixtures thereof;

(b) heating the mixture of gluten and aqueous solvent solution at a temperature between about 50° and 75° C.;

(c) mechanically separating undissolved solids from the resulting crude zein solution containing from about 5 to about 15% zein as well as extracted oil and oil solubles dissolved in said solvent;

(d) mixing said crude zein solution with pre-chilled water-soluble zein solvent which is in a more nearly anhydrous state than the solvent used in step (a), thereby decreasing the concentration of water in the crude zein solution and thereby chilling said crude zein solution to a temperature between about +10° and −25° C. which is above the freezing point of said zein solution and at which the solution separates into a taffy-like bottom liquid layer containing from about 20% to about 40% zein and only a small amount of the extracted oil and oil solubles dissolved in the solvent and a supernatant liquid solvent layer containing oil and oil solubles and only a small amount of zein dissolved therein; and (e) removing the supernatant liquid from the cool, taffy-like zein-alcohol mass.

References Cited

UNITED STATES PATENTS

| | | | |
|---|---|---|---|
| 1,884,015 | 10/1932 | Lougovoy | 424—71 |
| 2,206,310 | 7/1940 | Swallen | 260—123 |
| 2,221,560 | 11/1940 | Swallen | 106—153 |
| 2,221,561 | 11/1940 | Swallen | 106—153 |
| 2,272,488 | 2/1942 | Swallen | 260—123 |
| 2,287,649 | 6/1942 | Swallen | 260—123 |
| 2,332,356 | 10/1943 | Swallen et al. | 260—123 |

(Other references on following page)

UNITED STATES PATENTS

| | | | |
|---|---|---|---|
| 2,388,389 | 11/1945 | Coleman | 106—153 |
| 2,554,750 | 5/1951 | Pinner et al. | 260—123 |
| 2,733,234 | 1/1956 | Morris et al. | 260—123 |

OTHER REFERENCES

Industrial and Engineering Chemistry, March 1941, pp. 394–398, Swallen.

Chem. Abstracts, vol. 51, 1957, Sandor et al., 15039i.

Chem. Engineering, vol. 64, No. 9, p. 226 [flowsheet], 1957, forbath.

WILLIAM H. SHORT, Primary Examiner

H. SCHAIN, Assistant Examiner